UNITED STATES PATENT OFFICE.

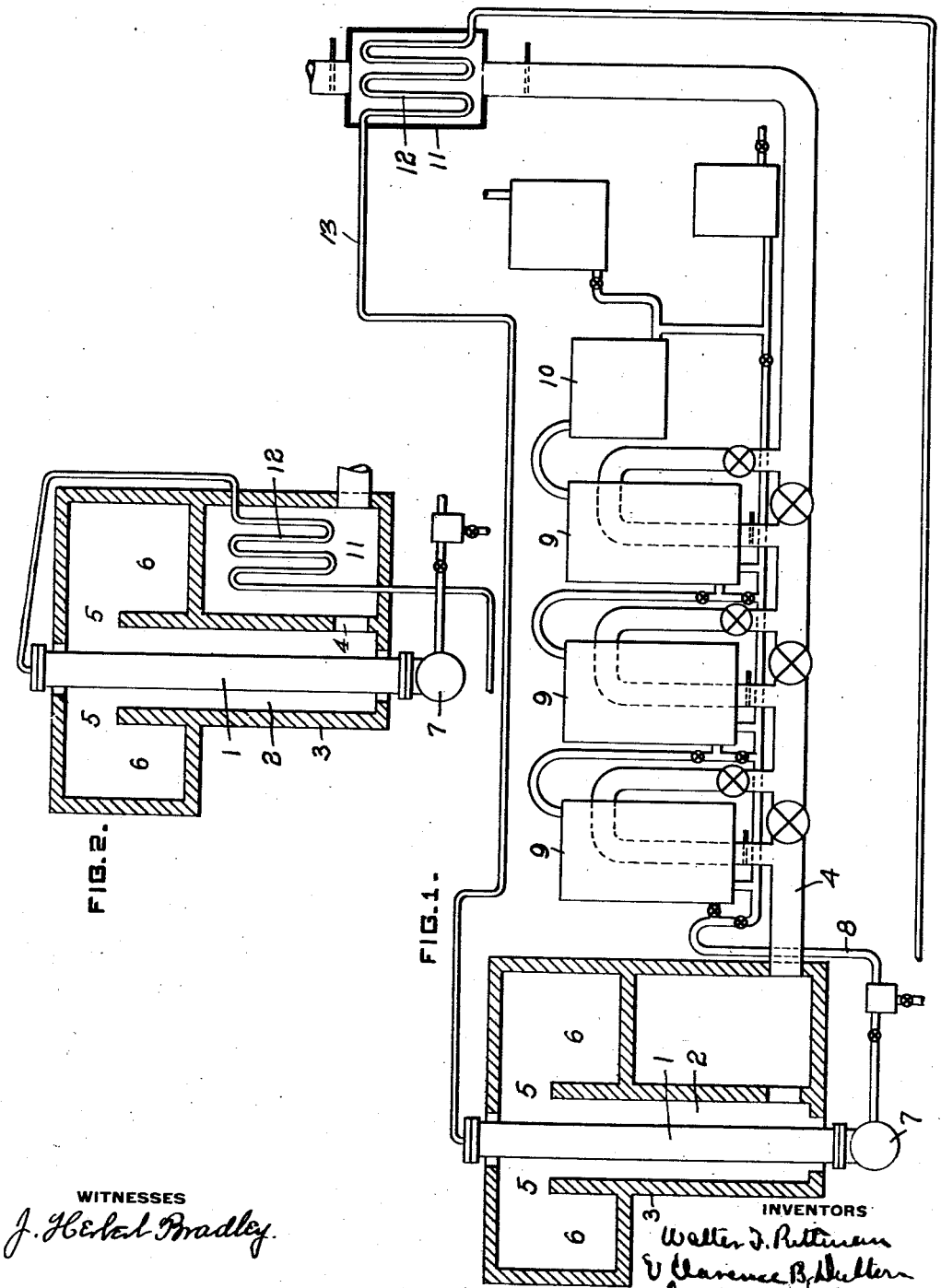

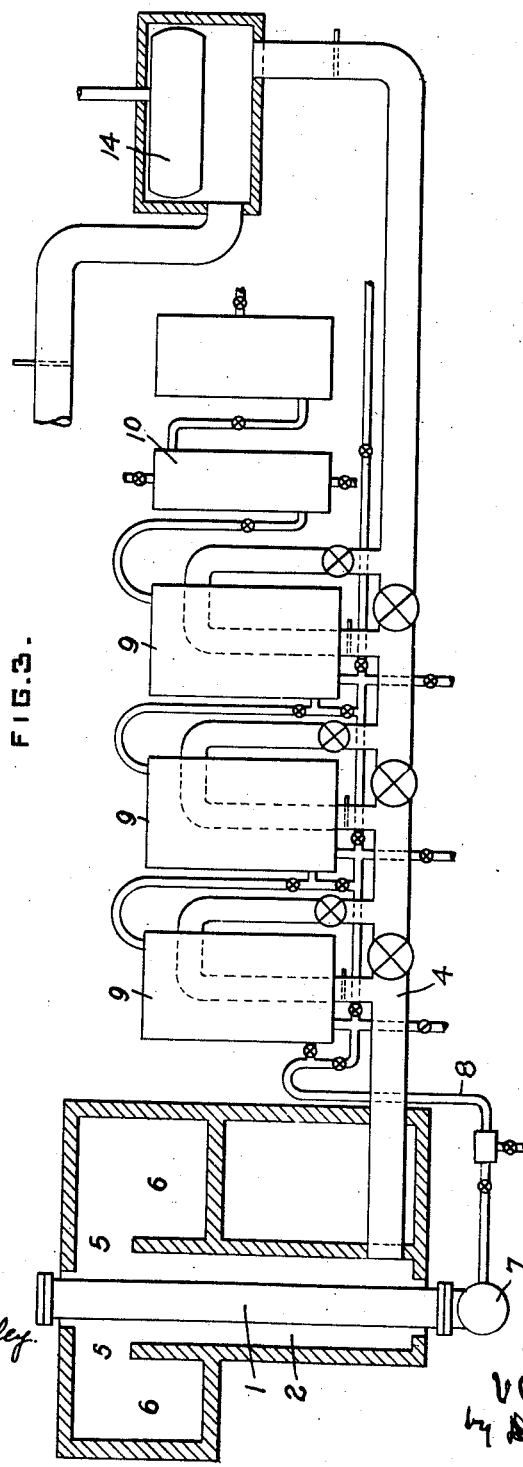

WALTER F. RITTMAN AND CLARENCE B. DUTTON, OF PITTSBURGH, PENNSYLVANIA.

TREATMENT OF HYDROCARBONS.

1,365,603.

Specification of Letters Patent.  Patented Jan. 11, 1921.

Application filed February 5, 1917. Serial No. 146,725.

*To all whom it may concern:*

Be it known that we, WALTER F. RITTMAN and CLARENCE B. DUTTON, residing at Pittsburgh, in the county of Allegheny and State of Pennsylvania, citizens of the United States, have invented or discovered certain new and useful Improvements in the Treatment of Hydrocarbons, of which improvements the following is a specification.

The vapor cracking process (see Department of the Interior Bulletin No. 114) of treating hydrocarbons in a gaseous condition, beginning with the crude material or distillate, and ending with the product sought, involves a series of operations or steps; and while each step is to a certain extent independent of the others, its efficiency is largely dependent upon the completeness of the preceding or preparatory step. These steps consist in raising the liquid hydrocarbons to a vaporizing temperature, vaporizing the heated liquid, heating the vapors to a cracking temperature, cracking the vapors and fractionally separating the product of the prior steps. While some of the steps involve the employment of a plurality of agents, heat is a necessary agent for the accomplishment of all the steps or operations, but not heat of the same potential or temperature for the several steps. As for example, in raising the liquid to a vaporizing temperature, a heat high in B. T. U.'s, but low in potential, is preferably employed; for vaporizing the liquid, the heat should be higher in B. T. U.'s and relatively higher in potential than in raising the temperature of the liquid; for raising the temperature of the vapors, the heat should be higher in potential than in the previous steps; cracking the vapors requires heat still higher in potential than in the preceding step, and variable as regards B. T. U.'s, dependent upon the character of the product formed, *i. e.*, whether ethylene gas, gasolene or aromatic hydrocarbons, and in fractionating, the heat should be relatively low in potential and may be high in B. T. U.'s.

It has been found that this hydrocarbon cycle, which is more fully and particularly set forth in applications Serial Nos. 29019 and 29020, filed by W. F. Rittman, May 18, 1915, and applications Serials Nos. 829169 and 85603, filed by M. C. Whitaker and W. F. Rittman, April 3rd, 1914, and March 24th, 1916, respectively, can be most advantageously carried out by a cycle of heat steps, operating in an order reverse of that of the hydrocarbon cycle. The hydrocarbon cycle, described in the foregoing applications, moves progressively from one step to the other in the following order:—

(*a*). Raising the liquid oil to a boiling temperature.
(*b*). Vaporizing the liquid oil.
(*c*). Raising the oil vapors to cracking temperature.
(*d*). Cracking the highly heated oil vapors.

In the practice of the invention, heat from a suitable source is caused to move through the following cycle of steps:—

(4). Heat for cracking the highly heated oil vapors.
(3). Heat for raising the oil vapors to cracking temperature.
(2). Heat for vaporizing the liquid oil.
(1). Heat for raising the liquid oil to a boiling temperature.

A comparison of these oil and heat cycles, shows that the material treated is progressively heated while the treating agent loses progressively potential capacity, and in general terms, the invention consists in the generation of heat having characteristics (potential and capacity), required for effecting the oil cycle described in the applications above mentioned, and the application of such heat in an order that will give the highest commercial efficiency in the practice of the Rittman process. The inter-relation of the oil and heat cycles is such as to give flexibility in the range of products and to give increased uniformity in the quality of such products. The process is the result of commercial operations and is especially designed and adapted for operations on a large scale.

In order to make heat from a common source efficiently supply the various kinds of heat above mentioned, in the carrying forward of the hydrocarbon cycle, it is necessary to supply such heat at a potential not less than the highest required in carrying forward any one of the steps heretofore mentioned, and also containing the greatest number of B. T. U.'s necessary in the steps and utilizing such heat in such sequence that in effecting the transformation involved in one step, one of the foregoing characteristics *i. e.*, potential or volume of the heat will be so modified as to render the heat suitable or best adapted for effecting one of the other steps in the oil cycle.

In the accompanying drawings forming a part of this specification, Figure 1 is a sectional view of a form of apparatus for carrying out those steps of the heat cycle involved in cracking the vapors; Fig. 2 is a view similar to Fig. 1, illustrating a modification of the apparatus and Fig. 3 is a view similar to Fig. 1 illustrating a modification of the apparatus.

In the practice of the invention, crude hydrocarbon or distillate thereof, heated as hereinafter described, is fed into a retort 1, wherein vaporization of the liquid oil is completed, heating the oil vapors and cracking the heated oils as hereinafter described, are effected under conditions of pressure, dependent upon the character of the product desired. Any suitable form or construction of heat generative means may be employed, but a construction having the general features herein shown, is preferred. The tubular retort 1 extends down through a chamber 2 formed by an annular wall 3, said chamber having its lower portion connected to an outlet flue 4. The upper portion of the chamber 2 is connected through the ports 5 to a combustion chamber 6, which preferably surrounds the upper portion of the chamber 2.

In the form of apparatus shown, the required heat is generated by the combustion of a gaseous fuel in the chamber 6, but other forms of fuel may be employed.

In the chamber 6 is generated heat having at least sufficient potential (i. e., above 400° C.) to effect the cracking of the vapors in the retort, and sufficiently high in capacity or B. T. U.'s to fulfil the requirements hereinbefore stated for heating the liquid, effecting its vaporization, and raising the temperature of the vapors. The ports connecting the combustion and heating chambers should be so arranged that the heat and products of combustion will come into contact with that portion of the retort in which it is desired to initiate the cracking or decomposition. As cracking will occur to a greater or less degree at all points in the retort, the cracking zone cannot be accurately defined, but the most effective cracking will occur in the hottest portion of the retort, and the relative position of such portion can be fixed by the arrangement of the ports 5.

The ports 5 should be so located relative to the point of entrance of the oil into the retort, as to afford opportunity for the vapors to be heated to or comparatively to cracking temperature before they reach the cracking zone. The heat as it enters the chamber 2 and impinges on the retort, will, as above stated, have sufficient potential and B. T. U.'s to effect the several steps in the oil cycle. In supplying heat for the cracking, there will be a certain drop in potential, but there will not be any such reduction of capacity as to render the heat inefficient for the accomplishment of the other steps of the oil cycle. Hence, in effecting cracking, and prior to its passing to and along the vapor-heating zone, heat will have been modified to approximate the desirable vapor-heating conditions hereinbefore specified. The heat is still further modified by the reduction of potential in heating the vapors, so that when it reaches the vaporizing zone of the retort, it will be relatively low in potential but its quantity will still be sufficient for the work required for it.

As the heat and products of combustion flow down through the heating chamber 2 in contact with the retort, there will be a reduction of potential, but with sufficient potential and B. T. U.'s so that the heat conditions in the products of combustion will still be well adapted for effecting the first step in the oil cycle, i. e., heating the liquid prior to its being fed to the retorts.

The lower end of the retort is provided with a receptacle 7 into which are discharged the gases, vapors, liquids and solids resulting from the reactions occurring in the retort. The vapors and gases flow from this receptacle through the pipe 8 which may be connected directly to a condenser adapted to condense substantially all the vapors. It is preferred however, to fractionate the condensable products of the reactions occurring in the retort, and to further utilize the heat from the common source and not absorbed in carrying out the other steps of the oil cycle, and with that end in view the pipe 8 is connected to the first one of two or more fractional condensers 9, connected in series as shown.

These condensers are also shown connected in series to the flue 4 forming the outlet from the heating chamber 2. As before stated, the heat potential of the gases escaping from the chamber 2 will be materially decreased while passing through chamber 2 and a further decrease will be effected in the first condenser 9 and in the successive condensers. In these several condensers the vapors of hydrocarbons having approximately the same or a higher boiling point than the temperature of the products of combustion passing through the condenser, will be liquified. The last one of the fractional condensers 9 is connected to a condenser 10, adapted to condense substantially all the vapors having a boiling point above atmospheric temperature.

In order to effect the first step of the oil cycle, the products of combustion as they flow from the last of the series of the fractional condensers, or from the chamber 2 when fractionization is not desired, are caused to pass through a chamber 11, in which is located a coil of pipe 12, forming a portion of the supply pipe 13 leading to the retort 1. By the time the products of combustion reach the chamber 11, they will be lower in potential but still high in B. T. U.'s.

It is characteristic of the process described herein, that starting with heat high in potential and B. T. U.'s, it is so applied or utilized that in accomplishing each step in the oil cycle, one or the other of its characteristics is so modified that close approximation to proper heat conditions for effecting another step is attained. It is further characteristic of the process herein described that substantially instantaneous vaporization of the liquid is effected, so that a continuously maintained uniform mixture of hydrocarbon vapors is thereafter subjected to the treatment described.

Before subjecting crude hydrocarbons containing gasolene or other desired products, the gasolene or the desired product should be distilled off before being cracked as herein described. In such cases, the heater 11 with its coil 12 is not necessary as the products of combustion from the fractionating element, or direct from the heating chamber 2 may be employed for distilling off the gasolene as indicated in Fig. 3, and the residue pumped while heated from the still 14 into the retort.

We claim herein as our invention:

1. The process herein described of heating and substantially vaporizing a hydrocarbon liquid so as to produce a constantly maintained uniform mixture of vapors and heating and cracking said vapors which consists in drawing from a common source heat having sufficient potential for cracking the vapors and containing sufficient B. T. U.'s for heating the liquid, applying such heat to a portion of the column of vertically moving fluid for cracking vapors, raising the fluid of another portion of such column to a cracking temperature prior to their entering the cracking zone, vaporizing the fluid in a third portion of the column and raising the fluid to a vaporizing temperature.

2. The process herein described for heating and substantially vaporizing a hydrocarbon liquid so as to crack a constantly maintained uniform mixture of vapors and heating and cracking said vapors which consists in drawing from a common source heat having sufficient potential for cracking the vapors and containing sufficient B. T. U.'s for heating the fluid, applying heat containing a maximum percentage of the B. T. U.'s and a high heat potential to a portion of the vertically moving column of fluid for the purpose of cracking the vapors, raising the fluid to a cracking temperature in another portion of the column, vaporizing the fluid at the upper end of the column and then utilizing the heat from which a portion of the B. T. U.'s have been extracted and of a lower heat potential to effect a preheating of the oil.

3. The process herein described of heating and substantially vaporizing a liquid hydrocarbon so as to produce a constantly maintained uniform mixture of vapors, heating and cracking said vapors with heat from a common source of heat having sufficient potential for cracking the vapors and sufficient B. T. U.'s for heating the liquid, applying such heat first to the upper portion of a substantially vertical cracking retort, then applying the residual heat to a set of coils of relatively small diameter.

In testimony whereof, we have hereunto set our hands.

WALTER F. RITTMAN.
CLARENCE B. DUTTON.